United States Patent [19]

Oshida et al.

[11] Patent Number: 4,564,296
[45] Date of Patent: Jan. 14, 1986

[54] PLATE THICKNESS MEASURING METHOD AND APPARATUS

[75] Inventors: Yoshitada Oshida, Fujisawa; Hiroshi Makihara; Nobuhiko Aoki, both of Yokohama, all of Japan

[73] Assignee: Hitachi, Ltd., Tokyo, Japan

[21] Appl. No.: 305,374

[22] Filed: Sep. 24, 1981

[30] Foreign Application Priority Data

Sep. 26, 1980 [JP] Japan .................. 55-132923

[51] Int. Cl.$^4$ ............................................. G01B 11/06
[52] U.S. Cl. ...................................... 356/381; 250/201
[58] Field of Search .............. 356/381, 382, 376, 123, 356/124, 125, 124.5; 250/201 AF

[56] References Cited

U.S. PATENT DOCUMENTS

| | | | |
|---|---|---|---|
| 2,351,770 | 6/1944 | Koenig | 356/381 |
| 3,019,708 | 2/1962 | French et al. | 356/125 |
| 3,606,541 | 9/1971 | Sugano et al. | 356/376 |
| 3,804,523 | 4/1974 | McCormack | 356/382 |
| 4,359,282 | 11/1982 | Garrison | 356/376 |

FOREIGN PATENT DOCUMENTS

| | | | |
|---|---|---|---|
| 2259892 | 6/1974 | Fed. Rep. of Germany | 356/125 |
| 2741807 | 3/1979 | Fed. Rep. of Germany | 356/376 |
| 2030415 | 4/1980 | United Kingdom | 356/123 |

*Primary Examiner*—R. A. Rosenberger
*Attorney, Agent, or Firm*—Antonelli, Terry & Wands

[57] ABSTRACT

A plate thickness measuring method and apparatus, is provided wherein a fine pattern is projected on the front and rear surfaces of an object to be measured via object lenses oppositely provided on the front and rear surfaces of the object to be measured in its thickness. The image of the projected pattern on the object to be measured is formed via said object lenses, and the contrast of the formed pattern image is detected. Then the object lenses are moved slightly to achieve the maximum of the contrast, or to perform an automatic focusing control. The thickness of the object to be measured can then be estimated from the difference of the positions of the object lenses at which the maximum contrast, or the focused condition, are obtained.

14 Claims, 12 Drawing Figures

PLATE THICKNESS MEASURING METHOD AND APPARATUS

BACKGROUND OF THE INVENTION

This invention relates to a method and apparatus for measuring the thickness of an object to be measured with high precision in a non-contact manner, and particularly to a plate thickness measuring method and apparatus suitable for measuring an extremely thin plate of any material.

In semiconductor manufacturing processes, it is important to produce constant-thickness wafers for uniform characteristics. For example, a wafer for pressure sensor diaphragms, which is etched into a thin film, an extremely thin metal foil or plate, and the like have been measured in their thickness by a dial gauge of the contact type. In this case, the measurement has been made at several points on the plate to be measured, and the thickness of the other parts is assumed from the measured values at the several points. However, in this conventional measuring method, since the measuring probe is made to contact with the object to be measured, the object to be measured may become flawed or contaminated by the contacting operation, and this becomes defective. Moreover, the measured thickness is dependent on the contact pressure of the measuring probe and the measuring point, and thus sufficient precision (less than 1 μm) can not be obtained.

SUMMARY OF THE INVENTION

It is an object of this invention to provide a plate thickness measuring method and apparatus of non-contact type with the conventional drawbacks obviated and which can measure the thickness of the object with high precision.

In order to achieve the above object of the invention, a detecting head of a plate thickness measuring detector is provided at both the front and rear surfaces of the object to be measured. A fine pattern is projected via the object lenses provided at the detecting heads on the front and rear surfaces of the object to be measured. The projected pattern on the front and rear surfaces of the object to be measured is then reflected away therefrom to pass the object lenses and form an image on an image pattern detector. The contrast of the image on the detector is determined by the signal from the detector. The object lenses are moved so that the contrast becomes large. The positions of the object lenses at which the maximum contrast signal has been achieved are determined for each detecting head. From the positions of the object lenses, the thickness of the object to be measured interposed between the object lenses can be estimated as the difference between the positions.

In addition, in this case, a reference-thickness sample of a known thickness is provided in the vicinity of the object to be measured, and the above-mentioned focusing operation is performed on this reference thickness sample to determine the positions of the object lenses. The difference between the positions is employed as the thickness of the reference sample to calibrate the later measurement of any object to be measured. Consequently, this prevents a change of the environmental conditions to the measuring apparatus, particularly temperature change causes the measuring apparatus from expanding production of measurement error. Therefore, the absolute size (plate thickness) can be measured with high precision and a in non-contact manner.

Moreover, according to this invention, the reference thickness sample between the object lenses is removed so that the object lenses are directly opposed via nothing. Then, the actual image of the pattern formed on a focus plane in space, which is projected from the opposite object lens to each other, is directly picked up and the focusing operation is performed. Next, the focus planes of the object lenses are coincident with each other and the distance between the object lenses is calibrated with high precision to enable the thickness of the object to be measured with high precision.

DESCRIPTION OF THE PREFERRED EMBODIMENTS

Figure 1:
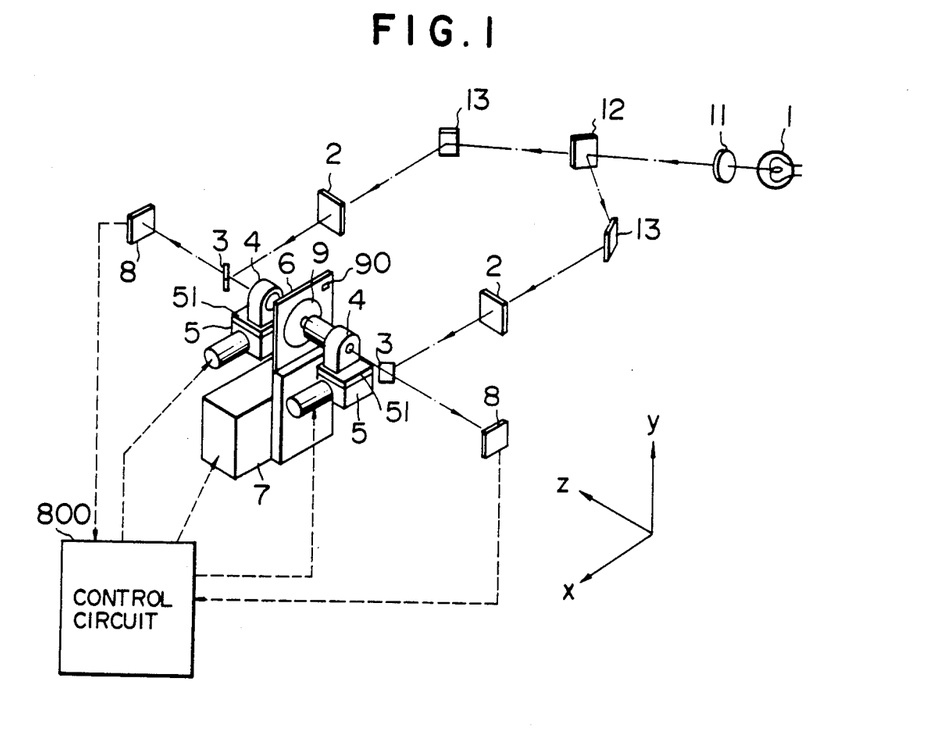
FIG. 1 is the whole arrangement of one embodiment of the plate thickness measuring apparatus of the invention.
Figure 2:
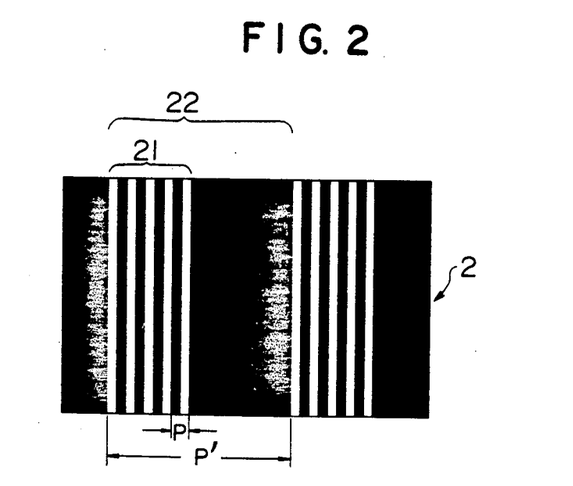
FIG. 2 shows an example of the fine pattern used in the apparatus of FIG. 1.

This invention will hereinafter be described with reference to the accompanying drawings. FIG. 1 is a schematic diagram of an embodiment of a plate-thickness measuring apparatus of this invention. There is shown a light source 1 for irradiating the front and rear surfaces of an object to be measured. A focusing lens 11 is provided in front of the light source 1. A beam splitter 12 serves to separate the light passing through the lens 11 into two parts in different directions, which are reflected from mirrors 13 into detecting heads for the object to be measured. On the front surfaces of the reflecting mirrors 13 are formed two different-pitch fine patterns of alternately arranged transparent and opaque stripes (or a two-period pattern of a dense p-pitch pattern 21 and a coarse p'-pitch pattern 22) 2 consisting of two different space frequency components as shown in the enlarged diagram of FIG. 2. In FIG. 2, the black areas are opaque and white areas are transparent. A half mirror 3 reflects the light passing through the fine pattern 2, at right angle into an object lens 4 to pass through the object lens 4 along its light axis.

The object lens 4 is provided on light axis at two different positions at which the two parts of light respectively arrive, and which are located on a drive mechanism 5 that can be controlled to move in three directions X, Y and Z as shown in FIG. 1. Reference numeral 9 represents an object the thickness of which is to be measured, and which is supported at its periphery by a support mechanism 6. The support mechanism 6 is mounted on a carrier 7 for the object to be measured and thereby set in position. Shown at 800 is a control circuit for this apparatus, by which the object to be measured, 9' is allowed to be irradiated, and the drive mechanism 5 and the carrier mechanism 7 are allowed to be driven on the basis of the resulting reflected light so as to adjust the positions of the object lens 4 and the object to be measured 9. Shown at 8 is a device for detecting the contrast of the image of fine pattern 2 formed by the object lens 4 to supply to the control circuit 800 with a control signal showing the maximum of the contrast signal. On part of the support mechanism 6 for supporting the object to be measured 9 is provided a reference thickness sample 90 having a known reference thickness for the reference to the object 9. How to use the sample 90 will be described later. Thus, the plate-thickness measuring apparatus has on both sides of object 9 two plate-thickness detecting heads mainly including the half mirrors 3, object lens 4 and image pattern detectors 8. The image pattern detector 8 may be a self-scan type solid-state imager (CCD) which is arrayed in two dimensions, the combination of scanning means for rotating a reflecting mirror in a predetermined direction to scan and a self-scan type solid state imager (CCD) arranged in one dimension to be perpendicular to the scanning direction, or the like.

Referring to FIG. 1, the light from the light source 1 is focused by the lens 11 and split by the beam spliter 12 into two parts in different directions, which are reflected from the mirrors 13 at the detecting heads so that the images of the fine patterns 2 are fed to the half mirrors 3. The light transmitted through the fine patterns is reflected from the mirrors 3 and transmitted through the object lens 4 to form reduced images of the fine patterns 2 on the front and rear surfaces of the object to be measured 9. The projected fine patterns are reflected from the front and rear surfaces of the object 9, and transmitted through the object lens 4 and half mirrors 3 to form enlarged images of the reduced patterns on the image pattern detectors 8. The output signals from the detectors 8 are applied to the control circuit 800, where the contrast signals are produced thereby to drive the drive mechanisms 5, thus the object lenses 4 being driven in the Z-axis direction. Consequently, the reduced patterns of the fine patterns 2 are focused on the front and rear surfaces of the object 9 with the highest contrast. These reduced patterns are further focused on the image pattern detectors with the highest contrast by the control circuit 800, which will be described later. In order to meet the above highest contrast image focusing condition, it goes without saying that the length of the path from the object lens 4 to the fine pattern 2 must be equal to that from the object lens 4 to the light receiving surface of the image pattern detector 8.

At the instant the best focused condition has been reached, the positions of the object lenses 4 are detected by lens position detectors 51.

In the embodiment of FIG. 1, the object lens moving mechanism 5, 51 is driven by a pulse motor and the positions of the object lenses are detected by counting drive pulses for the pulse motor. The origin of the pulse counting will be described later. It will be evident that the position of the object lenses can also be detected by driving the object lens moving mechanism by a DC control motor rotated with use of a rotary encoder or by a linear scale.

Figure 3A:
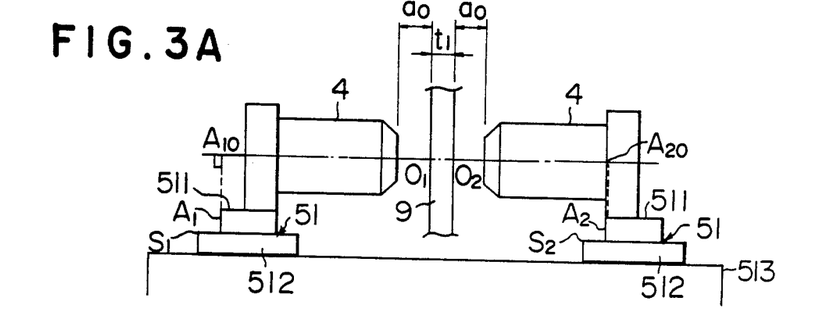
FIGS. 3A and 3B show relative positions of the object lenses and the object-lens position detecting means in FIG. 1.
Figure 3B:
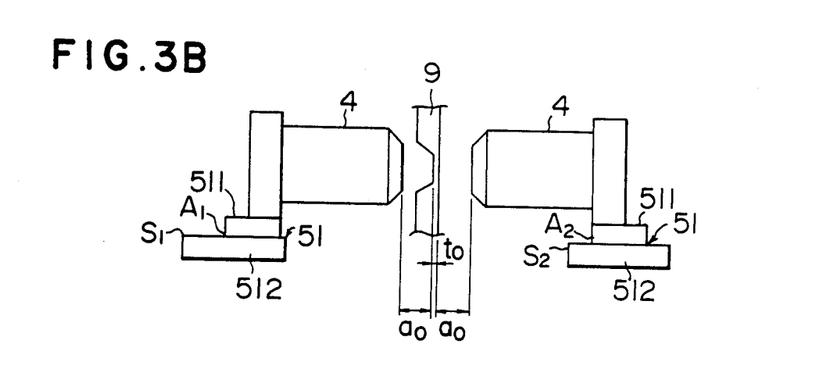

FIGS. 3A and 3B show that if the positions of the object lenses are detected, the thickness of the object to be measured can be calculated. First, let it be described how to measure the object 9 the thickness of which is as thin as 0 to 1 mm. For example, a silicon wafer which will ultimately be used for a pressure sensor is originally about 200 $\mu$m thick and it is etched to a desired thickness of about 20 to 40 $\mu$m by an etching process. Most of other wafers used in the semiconductor processing also have a thickness within the range of 0 to 1 mm. When a sample of such thickness is intended to be measured with the absolute precision of about 0.5 $\mu$m, an object lens for a microscope having a power of about 40X is used as the object lens 4. As will be described in detail later, when the distance between the surface of the object to be measured and the object lens is $a_0$ (strictly speaking, $a_0 \pm \delta, \delta < 0.5$ $\mu$m) irrespective of the thickness of the object which is within this range, the fine pattern image is formed on the image pattern detector with the highest contrast. Therefore, for a relatively thick (1 mm or above) object to be measured as shown in FIG. 3A or for a thin object as shown in FIG. 3B, the distance $\overline{S_1 A_1}$, $\overline{S_2 A_2}$ between one end $S_1$, $S_2$ of a spatially fixed side detecting body 512 of the lens position detecting means 51 and one end $A_1$, $A_2$ of a movable-side detecting body 511 is determined by the addition or subtraction of constant value $\alpha_1$, $\alpha_2$ to or from the reading itself $l_1$, $l_2$ of the lens position detecting means 51; or $\overline{S_1 A_1} = l_1 + \alpha_1$ (or $l_1 - \alpha_1$), $\overline{S_2 A_2} = l_2 + \alpha_2$ (or $l_2 - \alpha_2$), where $\alpha_1$ and $\alpha_2$ are determined by the position of the origin for counting of the lens position detecting means.

Since the distance from the object lens 4 to the surface of the object to be measured 9 is constant with error $\delta$ less than 0.5 $\mu$m, independently of the thickness of the object, the distance between the foot $A_{10}$, $A_{20}$ of a perpendicular extended from $A_1$, $A_2$ to the light axis and the surface $O_1$, $O_2$ of the sample is a constant value $\beta_1$, $\beta_2$ with the error $\delta$. Thus $$t_1 = \overline{A_{10} A_{20}} - \beta_1 - \beta_2 \qquad (1)$$

$$= \overline{A_2 A_1} - \beta_1 - \beta_2$$

$$= \overline{S_1 S_2} + \overline{S_2 A_2} - \overline{S_1 A_1} - \beta_1 - \beta_2$$

$$= \overline{S_1 S_2} + l_2 - l_1 + (\alpha_2 - \alpha_1 - \beta_1 - \beta_2)$$

In Eq. (1), $\overline{S_1 S_2}$ is constant since $S_1$ and $S_2$ are spatially fixed points, and since the term within parentheses includes all constants, the thickness of the object to be measured is determined by the difference between $l_1$ and $l_2$, or the readings (detected values) of the lens position detecting means.

To find the absolute value of $t_0$ in Eq. (1), it is not always necessary to determine $\overline{S_1 S_2}$, $\alpha_1$, $\alpha_2$, $\beta_1$, and $\beta_2$. If a sample of known $t_0$ is measured in advance, a calibration value $C_0$ in the following Eq. (2) is determined from the readings $l_{10}$, $l_{20}$ of the lens position detecting means at that time:

$$C_0 = l_{20} - l_{10} - t_0 \qquad (2)$$

Thereafter, as long as the $\alpha_1$, $\alpha_2$, $\beta_1$, $\beta_2$ and $\overline{S_1S_2}$ are not changed, the thickness $t_1$ of the object to be measured can be determined by $$T_1 = l_2 - l_1 - C_0 \quad (3)$$

The conditions under which the $\alpha_1$, $\alpha_2$, $\beta_1$, $\beta_2$, and $\overline{S_1S_2}$ are not changed are:

(1) $\overline{S_1S_2}$ is not changed by thermal expansion or the like;
(2) when the distance between the surface of the object to be measured and the lens is kept constant with the focused state (error $\delta$ less than allowable constant value); and
(3) when the origin for counting of the lens position detecting means is not changed between the case of measuring a sample of reference thickness and the case of measuring the object to be measured.

The above three conditions must be satisfied.

The method and apparatus according to this invention will be described which satisfies the above conditions and is capable of measuring the absolute thickness.

The effect of the condition (1) will hereinafter be described briefly. The distance, $\overline{S_1S_2}$ is assumed to be, for example, of the order of 100 mm. If brass having coefficient of thermal expansion of about $2 \times 10^{-5}/°C$. is used for the material of a base 513 for holding the fixed-side detecting body 512 of the lens position detecting means 51 or the material of the fixed-side detecting body 512 and the fixed-side detecting body 512 having the mirror cylinder of the object lens 4 and the lens moving mechanism and so on, the distance $S_1S_2$ is changed by 2 $\mu$m in length with a temperature change of 1° C. To reduce the absolute thickness measuring precision to 0.5 $\mu$m or below, this effect can not be neglected.

In this invention, just before or after the object to be measured is measured, a sample 90 of a known reference thickness, which is provided at part of the object supporting mechanism 6, is measured and the calibration value $C_0$ is calculated from Eq. (2) by the above method. Then, the measured values $l_2$ and $l_1$ on the object to be measured and the calibration value $C_0$ are substituted into Eq. (3), thus yielding the true absolute thickness. The measurement of the sample 90 just before or after the measurement of the object 9 is, of course, performed while the temperature does not change.

While the precision absolute measurement with use of a reference thickness sample will be described hereinafter, the distance between the object lenses can stably be kept constant by employing the material and structure under which the distance between the object lenses is not affected by the temperature change. If the mirror cylinder of the object lenses 4 is made of certain material, e.g. brass, the object lens drive mechanism 511, 512 and the base 513 for supporting it are made of the same material as that of the mirror cylinder, i.e. brass so that the thermal expansion of the base can be cancelled out by that of the mirror cylinder and object lens drive mechanism. In other words, in this case, only the distance between the object lenses is affected by the thermal expansion, and this distance is very short, for example, about 7 mm, so that the change of this distance is about 0.14 $\mu$m per temperature change of 1° C. Thus, in this case, the temperature may be changed ±1° C. at maximum between the case of measuring the sample 90 and the case of measuring the object 9. For the condition (3), that is, in order that the origin at which the lens position detecting means starts counting is not changed upon measuring the sample 90 of reference thickness and the object 9 to be measured, it is necessary, for example, to hold the values which the lens position detecting means counts during the period between the two measurements. In practice, the sample of reference thickness is measured before and after the measurement of the object 9.

Figure 4A:
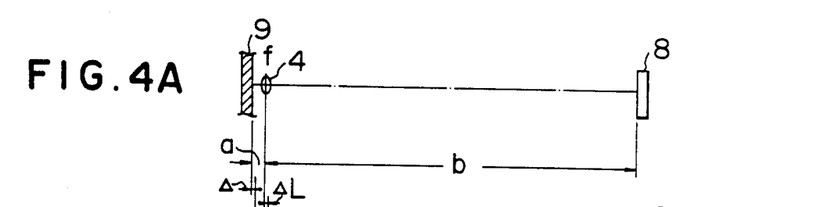
FIGS. 4A and 4B show relative positions of the object lens, the object to be measured, and the image pattern detector.
Figure 4B:
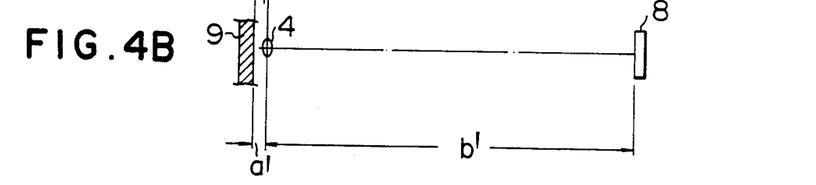

For the condition (2), or to keep constant the distance between the surface of the object to be measured and the lens under the focussed condition, this invention employs the following means. FIGS. 4A and 4B are explanatory diagrams useful for explaining this means, in which like elements corresponding to those of FIG. 1 are identified by like reference numerals. Letting the distance between the surface of the object to be measured 9 and the object lens 4 be represented by a, the distance between the object lens and the detecting surface of the image pattern detector 8 by b, and the focal length of the object lens by f. If a complete image is formed under the condition of FIG. 4A, the following equation is satisfied:

$$\frac{1}{a} + \frac{1}{b} = \frac{1}{f} \quad (4)$$

Then, under the condition as shown in FIG. 4B in which a thicker object to be measured is placed, if a complete image is formed, the equation of $$\frac{1}{a'} + \frac{1}{b'} = \frac{1}{f} \quad (5)$$

is satisfied. The image pattern detector 8 is fixed at the detecting head, and hence is on a spatially fixed point. On the other hand, the positions of the surface of the object to be measured 9 and the object lens 4 are spatially changed in accordance with a different object to be measured. The change $\Delta$ of the position of the surface of the object to be measured from FIG. 4A to FIG. 4B is given by $$\Delta = (a+b) - (a'+b') \quad (6)$$

since the surface of the image pattern detector 8 is fixed in position. The change $\Delta L$ of the position of the object lens is given by $$\Delta_L = b - b' \quad (7)$$

From Eqs. (4), (5), (6) and (7), the $\Delta_L$ can be expressed in terms of b, b', f and $\Delta$ as $$\Delta_L = \Delta \left( 1 + \frac{f^2}{b b' - f(b + b')} \right) \quad (8)$$

Figures 5, 7:
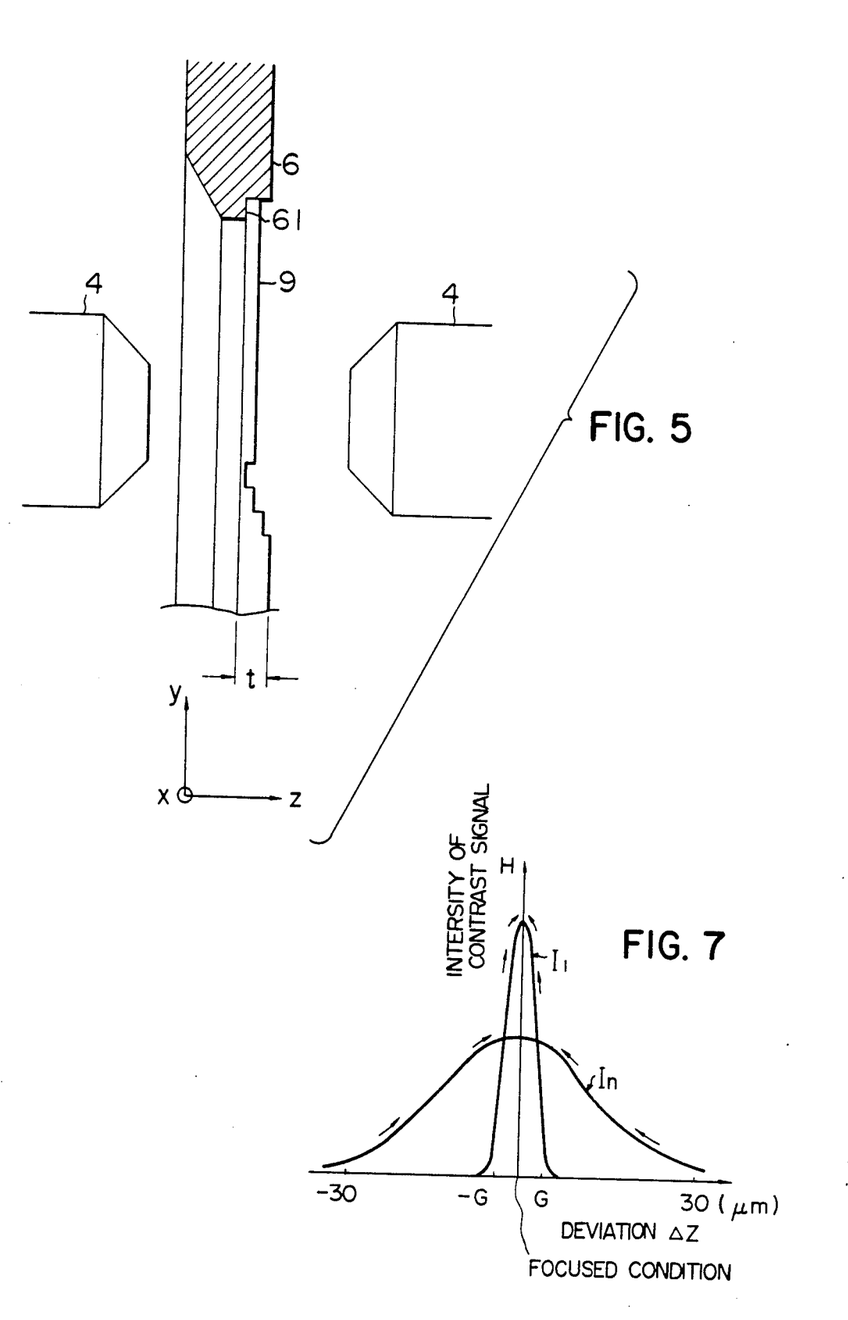
FIG. 5 shows a region to be measured.
FIG. 7 is a graph of the change of the contrast signal caused by a deviation from the focused condition.

From Eq. (8), the positional change of the object lens differs by $$\frac{\Delta f^2}{b b' - f(b + b')}$$

from the positional change $\Delta$ of the object to be measured. If the magnification power M of the object lens is 40X, the difference is about $\Delta/M^2$ since $b \approx b' = 41f$. In order for this value, or the absolute size measuring error $\Delta$ to be less than 0.5 $\mu$m, the $\Delta$ is required to be about 800 $\mu$m. That is, in order to reduce the absolute measuring error to 0.5 μm or below, it is necessary that the surface of the object to be measured be positioned within the change of 800 μm. If, for example, a wafer of the object 9 to be measured as shown in FIG. 1 is mounted on the object supporting mechanism 6 as shown in FIG. 5 so that if the wafer holding surface 61 is moved in the x- or y-direction by the object moving mechanism 7, the distance from the detecting head on the left side is not changed, the absolute size of the object 9 to be measured can be measured with precision of 0.5 μm or below as long as the change t of the surface of the object 9 opposite to that in contact with the wafer holding surface is within 800 μm.

Figure 6:
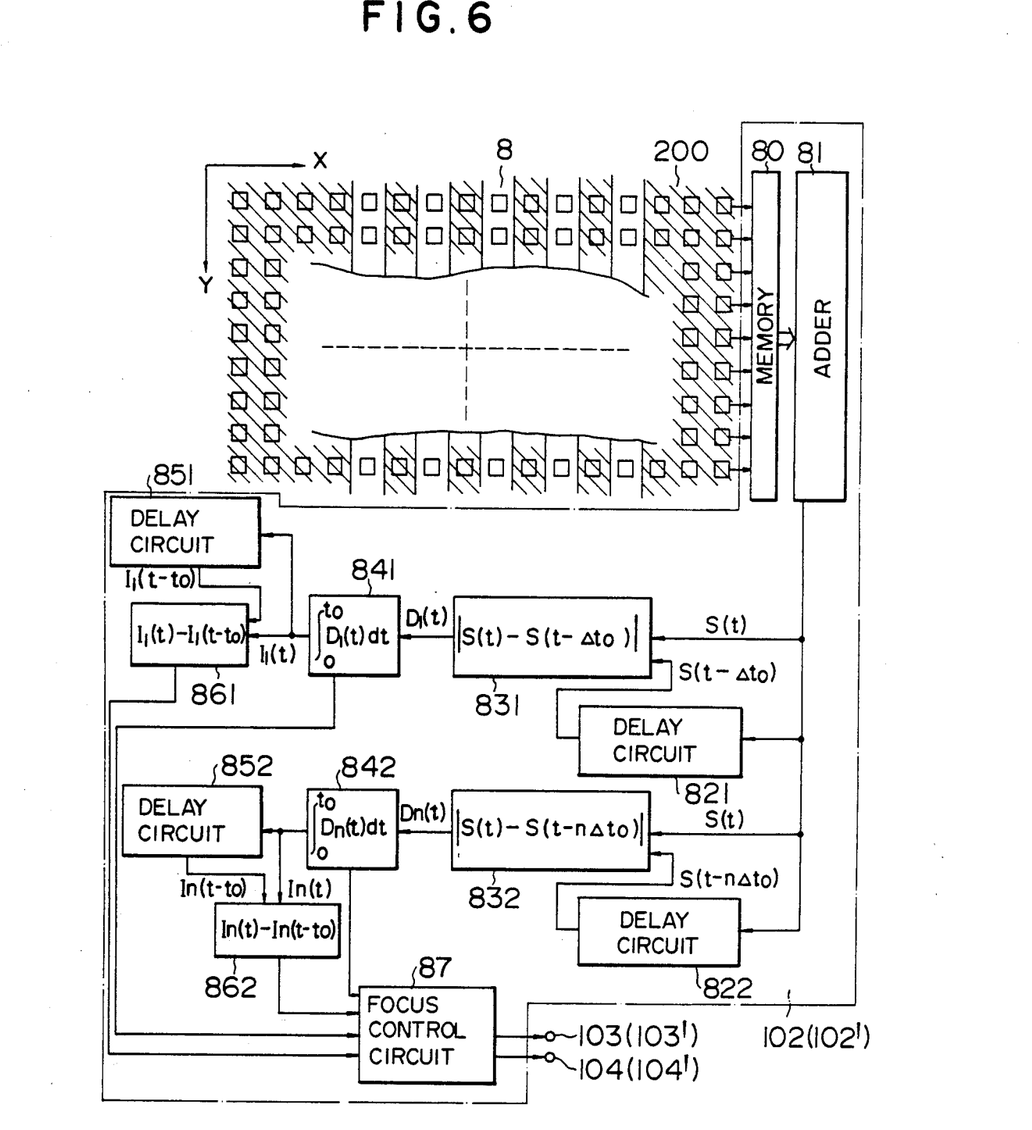
FIG. 6 is a circuit diagram of the contrast signal generator and automatic focusing control circuit in the apparatus of FIG. 1.

FIG. 6 shows a part of the control circuit 800 of the plate thickness measuring apparatus according to this invention. This circuit arrangement generates a contrast signal to perform automatic focusing control. The image pattern detector 8 is a self-scan type sensor of the two-dimensional array type with half the pitch p/2 of the dense pattern of the fine pattern. This image pattern detector 8 draws a sequence of signals in the x-direction and parallel signals in the y-direction to thereby store the signals in a memory 80. The signals drawn in parallel in the y-direction and stored in the memory are applied to an adder 81 where signals in each half of the pitch of the dense pattern in the y-direction are added together. The added signal is successively obtained at intervals of $\Delta t_0$ of time by the x-direction scanning. Now, the time period $\Delta t_0$ equals to a time required for scanning the half-pitch p/2 of the dense pattern in the x-direction. Thus obtained signal $S(t)$ is fed directly to absolute difference generators 831 and 832 and also through delay circuits 821 and 822 such as shift-registers to the absolute difference generators 831 and 832, respectively. The delay circuits 821 and 822 delay a signal by periods $\Delta t_0$ and $n\Delta t_0$ required for scanning the half-pitch p/2 of the dense pattern and the half pitch p'/2 of the coarse pattern in the x-direction, respectively. In this case, from the absolute value generator 821 is produced a signal of $S(t-\Delta t_0)$ for comparison with a signal the half-pitch p/2 of the dense pattern separated therefrom which is produced from the detector, and from the absolute value generator 822 is produced a signal of $S(t-n\Delta t_0)$ for comparison with a signal separated by the half-pitch p'/2 of the coarse stripe pattern therefrom. Thus, the absolute value generator circuits 831 and 832 produce at their outputs $$D_1(t) = |S(t) - S(t - \Delta t_0)|$$

$$D_d(t) = |S(t) - S(t - n\Delta t_0)|,$$

respectively. These signals are integrated over one scanning line in the x-direction (strictly speaking, across the interval of the image pattern) by integrating circuits 841 and 842, which then produce contrast signals $I_1(t)$ and $I_n(t)$ of the dense and coarse patterns of the projected fine pattern, respectively. These contrast signals are of course obtained at each scanning time $t_0$ during which the array sensor scans once in the x-direction. These contrast signals $I_1(t)$, $I_n(t)$ at each scanning are compared with the preceding contrast signals $I_1(t-t_0)$, $I_n(t-t_0)$ passed through delay circuits 851 and 852 such as shift-registers for delaying signals by a period $t_0$ by differential circuits 861 and 862. In other words, if the outputs of the circuits are positive, it is found that the object lens moves, in the direction in which the contrast increases, that is, toward the focused condition. If, on the contrary, the outputs are negative, the object lens is detected to move away from the focused condition. Thus, a signal indicative of the change of the contrast signal and the contrast signal itself are applied to a focus control circuit 87 where it is decided which direction the object lens is to be moved in and what amount it is to be moved. Then, the object lens is driven in accordance with the result.

FIG. 7 shows the change of the contrast signal I with respect to the deviation $\Delta Z$ from the focused condition, in which the object lenses used are of 40 magnifications, and the changes of the contrast signals $I_1$ and $I_n$ of the dense and coarse patterns are schematically shown when using 100 μm stripe pitch of the dense pattern of the fine pattern. If the contrast signal is deviated away from the focused state, the focus control circuit 87 employs the contrast signal $I_n$ of the coarse pattern. If it approaches to the focused condition, the circuit 87 employs the contrast signal $I_1$ of the dense pattern. Then, by the climbing control, or by driving the object lenses 4 with the apparatus of FIG. 4, the object lenses 4 is controlled to set at a position where the focused state is achieved.

When the object lenses 4 provided at the detecting heads are driven in this way to achieve the focused state, the object lenses 4 start reciprocating around the position where the focused state is achieved. The time at which the focused state is reached is naturally different between both detecting heads.

Figure 8A:
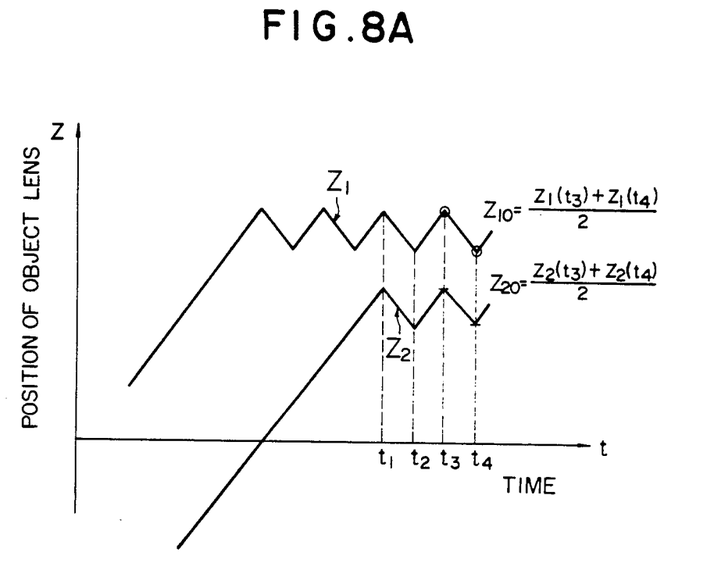
FIGS. 8A and 8B show the Z-direction positional change of object lenses upon controlling the focused condition and the way of detecting the position of the focused condition.
Figure 8B:
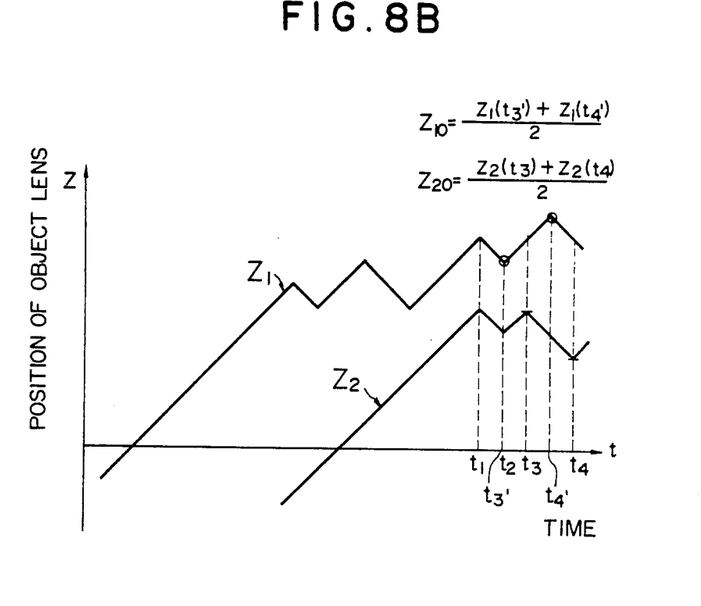

FIGS. 8A and 8B show the change of the coordinates $Z_1$, $Z_2$ of the object lens for both detecting heads, around the positions where the focused state is reached. As shown in FIGS. 8A and 8B, when the second detecting head reaches the focused state a short time after the first detecting head reaches the focused state, and when the object to be measured, for example, is deviated toward the Z-axis direction during this time lag, the center position (average) around which the object lens reciprocates deviates as shown in FIG. 8B. Thus, if the positions of the object lenses are read out almost at the same time on both detecting heads, the thickness measuring precision can be increased. The timing at which the positions of the object lenses are read will be described in detail with reference to FIGS. 8A and 8B. When the first detecting head reaches the focused state, first, for example, as shown in FIGS. 8A and 8B, it starts reciprocating. Thus, while waiting until the second detecting head reaches the focused condition, two values before the present time, of the coordinates at the turnback points of the reciprocations are renewed in turn and stored. In the meantime, when the second detecting head starts reciprocating, turnback coordinates $Z_2(t_3)$ and $Z_2(t_4)$ at the third and fourth turnback times $t_3$ and $t_4$ are used to determine $$Z_{2,4} = \tfrac{1}{2}\{Z_2(t_3) + Z_2(t_4)\}$$

Then, the values $Z_1(t_3')$ and $Z_1(t_4')$ at turnback times $t_3'$ and $t_4'$ ($t_3$ and $t_4$ in FIG. 8A), the closest points to the fourth turnback time $t_4$ of the object lens on the second detecting head are used to determine $$Z_{1,7} = \tfrac{1}{2}\{Z_1(t_3') + Z_1(t_4')\}$$

Thus, the positions at which both the detecting heads reach the focused condition almost at the same time are found, thereby permitting accurate thickness measurement.

Figure 9:
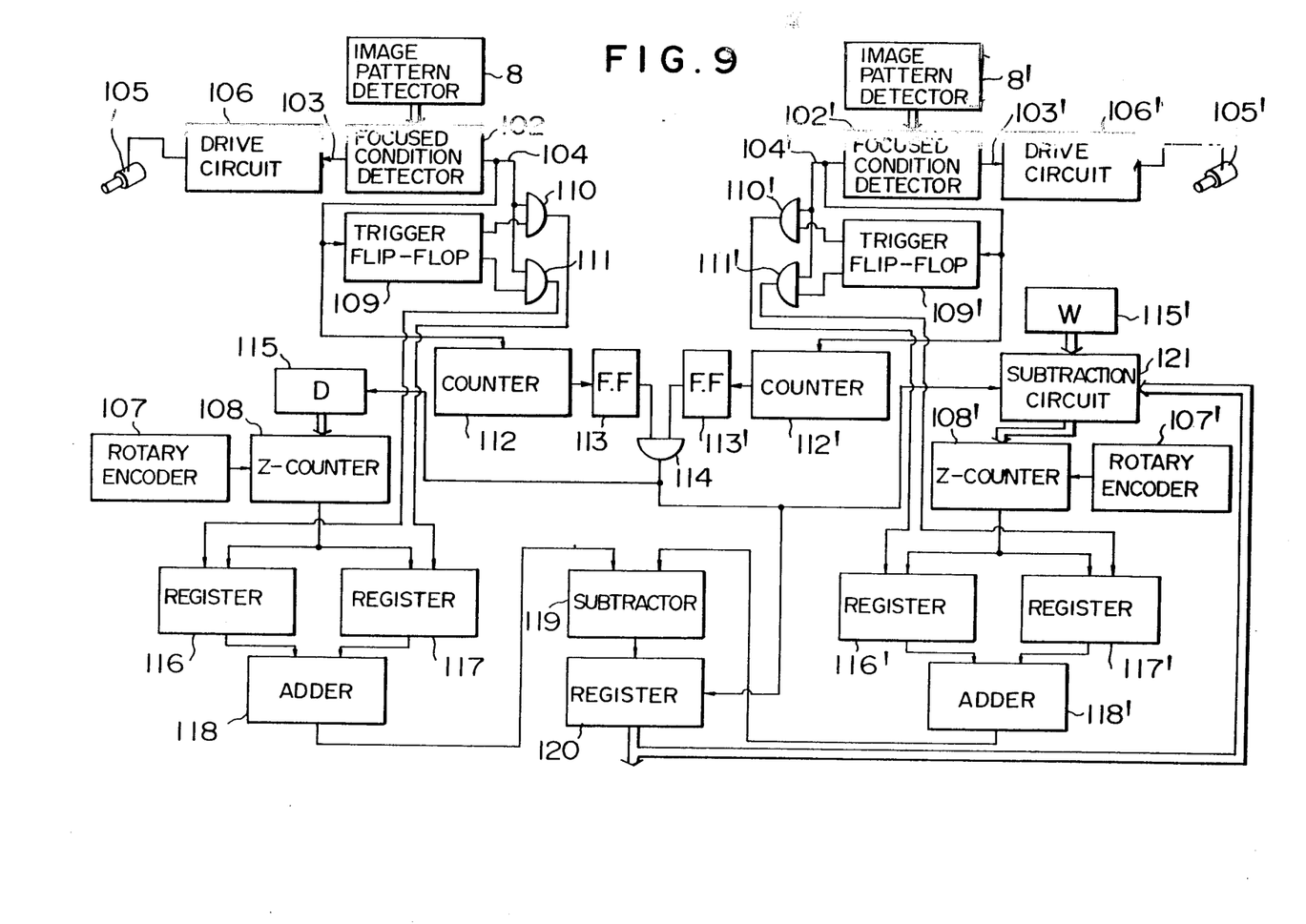
FIG. 9 is a block diagram of the control measurement apparatus for measuring the thickness of the object to be measured.

The operations as set forth above and the arrangement for achieving those operations will hereinafter be described with reference to FIG. 9.

The focused condition detecting circuit 102, 102' arranged as shown in FIG. 6 produces a command signal 103, 103' for ordering to move the object lens in a specific direction and a pulse signal 104, 104' for indicating inverted contrast. Reference numeral 105, 105' indicates a control motor for the object lens moving mechanism 5, 5', 106, 106' a drive circuit for driving the control motor 105, 105', 107, 107' a rotary encoder for producing a pulse signal in response to the movement of the object lens 4, 4', 108, 108' a Z-counter for counting pulses produced from the rotary encoder 107, 107' and storing the coordinates $Z_1$ and $Z_2$, 109, 109' a trigger flip-flop, 110, 110', 111, 111' an AND circuit. Moreover, 112, 112' represents a counter for counting the contrast inversion pulse, 113, 113' a flip-flop which is set when the focused condition is reached and the number of turnback points counted by the counter 112, 112' reaches a predetermined value, 114 an AND circuit, 115 a memory in which zero is recorded, and 115' a memory in which is stored a value of thickness of a reference-thickness sample measured in advance by a measurement gauge. Also, 121 designates a subtraction circuit, 116, 117, 116', 117' a register for alternately renewing two values, $Z_1(t_{n-1})$, $Z_1(t_n)$, $Z_2(t_{n'-1})$, $Z_2(t_{n'})$ before the present time, of the coordinates of the turnback points at which the focused state is reached by the AND circuit 110, 110', 111, 111' numeral 118, 118' an adder for determining avarage value $$Z_{1,n} = \tfrac{1}{2}\{Z_1(t_{n-1}) + Z_1(t_n)\},$$

$$Z_{2,n'} = \tfrac{1}{2}\{Z_2(t_{n'-1}) + Z_2(t_{n'})\},$$

119 a subtractor for determining $T_{n,n'} = Z_{1,n} - Z_{2,n'}$, and 120 a register for storing the output of the subtractor 119. When the front and rear surfaces of the object to be measured are brought to the focused condition and the number of turnback points (number of inversions) reaches a predetermined value, the register 120 produces the value outputted from the subtractor 119, or the thickness T of the object to be measured. Thus, when the reference thickness sample 90 is set on the object holding mechanism 6 and the front and rear surfaces of the sample 90 are brought to the focused condition, the AND circuit 114 produces a signal, and in the Z-counter 108' is set the difference between the thickness W of the reference thickness sample which is stored in the memory 115', and the measured result from the register 120, which difference is produced from the subtractor 121. Thus, the coordinates $Z_1$ stored in the Z-counter 108 and the coordinates $Z_2$ stored in the Z-counter 108' are relatively compensated, thereby determining the position of the origin for the object lens 4, 4'. Then, in place of the reference thickness sample 90, the object to be measured 9 is set on the object holding mechanism 6. The front and rear surfaces of the object to be measured 9 are brought to the focused condition by driving the control motors 105 and 105' with the signals from the focused state detecting circuit 102, 102' in a climbing manner. When the value set in the flip-flop 113, 113' is 4, the value stored in the register 120, or $$T = Z_{1,8} - Z_{2,4}$$

$$= \frac{Z_1(t_2) + Z_1(t_4)}{2} - \frac{Z_2(t_3) + Z_2(t_4)}{2}$$

is read therefrom, thus the thickness of the object to be measured 9 being accurately measured in non-contact manner.

As described above, since an extremely thin object such as a semiconductor wafer is measured in a non-contact manner, flaws due to contact as in the prior art are not caused on the object during measurement and therefore defective parts due to the flaw are not produced. Since there is no probability of flawing the object to be measured, the sampling inspection can be applied to all the products. Moreover, since the object to be measured can automatically be measured at a number of points thereon by changing measuring positions in turn by the object moving mechanism, the time taken to measure can be shortened. Also, since the absolute size can be measured with high precision in a non-contact manner, the thickness of the object which can not be measured in the prior art can be measured by the apparatus of this invention, without effect of the measuring apparatus (for example, contact pressure of the probe). In this case, measurement of not only the film thickness of a pressure sensor diaphragm but the wafer thickness before etching is possible, and in addition, general wafer plate thickness other than the pressure sensor wafer can be measured with precision of 0.5 μm.

According to this invention, as mentioned above, the object to be measured can be measured in thickness in a non-contact manner so that flaws due to contact never occurs upon measurement. Thus all the objects to be measured can be successively measured in thickness in a short time with high precision and high reliability most suitable for measurement of an extremely thin plate thickness.

While two fine patterns are provided in the above embodiment, only a single fine pattern may be used.

While a single light source is used in the above embodiment, two light sources may be used for two fine patterns provided.

While the above-described embodiment employs a self-scan type sensor with a two-dimensional array as the image pattern detector 8, a self-scan type sensor of one dimensional array, wherein an array is arranged in the x-direction, may be employed therefor in conjunction with a scanning mechanism where the array is scanned in the y-direction by rotating a scanning mirror to thereby attain the same effects as those attained by the two dimensional array type sensor.

We claim:
1. A plate thickness measuring apparatus comprising:
   a light source;
   a fine pattern of alternately arranged opaque and transparent stripes which includes a plurality of said opaque stripes and a plurality of said transparent stripes onto which light is radiated from said light source;
   a pair of object lenses respectively provided oppositely to one another adjacent to front and rear sides of the object to be measured for projecting said fine pattern onto the front and rear surfaces of the object to be measured;
   a pair of moving means for moving said pair of object lenses in the optical-axis direction perpendicular to the front and rear surfaces of the object to be mea- sured, each of said moving means respectively providing a drive means for automatically moving an associated one of said object lenses;

a pair of imaging devices respectively disposed at predetermined positions adjacent to said front and rear surfaces to pick up images by scanning reflected images of said fine patterns formed on the front and rear surfaces of the object to be measured which are reflected through said pair of object lenses, each of the reflected images being formed of alternately arranged light and dark stripes;

calculating means for integrating a plurality of contrast signals each comprising a difference between a light stripe signal and dark stripe signal of an image signal of a reflected image pattern picked up by said imaging devices to thereby obtain integral contrast signals for said front and rear surfaces of said object to be measured;

control means for actuating each of said drive means provided in each of said moving means to control the positions of the object lenses so as to achieve a maximum value of said integral contrast signals for said front and rear surfaces of said object to be measured obtained from said calculating means;

a pair of position detecting means for detecting the positions of said object lenses such that the relative positions of said object lenses are at the same value when the thickness of the object to be measured is zero; and measuring means for estimating the difference between the relative positions of the object lenses which are obtained from each of said position detecting means when each of said moving means are controlled by said control means to achieve the focused condition on the front and rear surfaces of the object, so as to determine the thickness of the object to be measured, wherein said fine pattern is formed of regular arrangement of dense and coarse patterns having at least two different space frequencies.

2. A plate thickness measuring apparatus according to claim 1, wherein said pair of position detecting means comprises a pair of lens position detectors for reading the positions of the pair of object lenses, a pair of memory means for storing position signals from said pair of position detectors, and a compensating means for relatively compensating the position coordinates stored in said pair of memory so that the value measured by said measuring means becomes a known, predetermined value.

3. A plate thickness measuring apparatus according to claim 2, wherein a reference sample having a known value is held by a support means and said compensating means is operated on the basis of a measurement made with said plate thickness measuring apparatus of said reference sample.

4. A plate thickness measuring apparatus according to claim 1, wherein said imaging device is formed of means for scanning the reflected image in a predetermined direction and a self-scan type solid-state imaging sensor having at least a one-dimensional array perpendicular to the predetermined direction.

5. A plate thickness measuring apparatus according to claim 1, wherein said imaging device is formed of a self-scan type solid state imaging sensor having a two-dimensional array.

6. A plate thickness measuring method comprising the steps of:

projecting a fine pattern of alternately arranged light and dark stripes which pattern includes a plurality of opaque stripes and a plurality of transparent stripes on front and rear surfaces of an object through first and second object lenses respectively disposed to be opposite one another on the front and rear surface sides of the object;

forming each of reflected images of said fine patterns formed on front and rear surfaces of the object through said first and second object lenses onto first and second photodetectors respectively located adjacent to said front and rear surfaces;

detecting contrast signals each comprising a difference between light stripe signals and dark stripe signals of image signals of the reflected image patterns picked up by each of said first and second photodetectors, wherein said photodetectors have scanning functions and include calculating means for obtaining the contrast signals;

performing automatic focusing control by moving each of said first and second object lenses slightly so as to achieve each of the maximum values of said contrast signals; and estimating the thickness of the object to be measured from the difference between the relative positions of said first and second object lenses at which the maximum values of said contrast signals are obtained, wherein said fine pattern is a two-period light and dark stripes pattern having two different space-frequency components, of which a small space-frequency coarse pattern is used to perform the coarse adjustment for said automatic focusing control and the large space-frequency coarse pattern of which is used to perform the fine adjustment for said automatic focusing control.

7. A plate thickness measuring method according to claim 6, wherein before measuring the thickness of the object to be measured a reference sample having a known thickness is set at the place where the object to be measured is placed instead of said object, and wherein said object lenses are moved until the focused condition is achieved with respect to fine patterns formed on the front and rear surfaces of said reference sample to thereby detect the thickness of said reference sample in the same way as the case where the thickness of the object to be measured is estimated, and the relative position coordinates of both of said object lenses under the focused condition are compensated on the basis of the known plate thickness and the detected thickness of said reference sample.

8. A plate thickness measuring apparatus comprising:

a light source;

a fine pattern of alternately arranged opaque and transparent stripes which includes a plurality of said opaque stripes and a plurality of said transparent stripes onto which light is radiated from said light source;

a pair of object lenses respectively provided oppositely to one another adjacent to front and rear sides of the object to be measured for projecting said fine pattern onto the front and rear surfaces of the object to be measured;

a pair of moving means for moving said pair of object lenses in the optical-axis direction perpendicular to the front and rear surfaces of the object to be measured, each of said moving means respectively providing means for automatically moving an associated one of said lenses;

a pair of imaging devices respectively disposed at predetermined positions adjacent to said front and rear surfaces to pick up images by scanning reflected images of said fine patterns formed on the front and rear surfaces of the object to be measured which are reflected through said pair of object lenses, each of the reflected images being formed of alternately arranged light and dark stripes;

calculating means for integrating a plurality of contrast signals each comprising a difference between a light stripe signal and dark stripe signal of an image signal of a reflected image pattern picked up by said imaging devices to thereby obtain integral contrast signals for said front and rear surfaces of said object to be measured;

control means for actuating each of said drive means provided in each of said moving means to control the positions of the object lenses so as to achieve a maximum value of said integral contrast signals for said front and rear surfaces of said object to be measured obtained from said calculating means;

a pair of position detecting means for detecting the positions of said object lenses such that the relative positions of said object lenses are at the same value when the thickness of the object to be measured is zero; and measuring means for estimating the difference between the relative positions of the object lenses which are obtained from each of said position detecting means when each of said moving means are controlled by said control means to achieve the focused condition on the front and rear surfaces of the object, so as to determine the thickness of the object to be measured, wherein said fine pattern is a two-period light and dark stripes pattern having two different space-frequency components, of which a small space-frequency coarse pattern is used to perform the coarse adjustment for said automatic focusing control and the large space-frequency coarse pattern of which is used to perform the fine adjustment for said automatic focusing control.

9. A plate thickness measuring apparatus according to claim 8, wherein said pair of position detecting means comprises a pair of lens position detectors for reading the positions of the pair of object lenses, a pair of memory means for storing position signals from said pair of position detectors, and a compensating means for relatively compensating the position coordinates stored in said pair of memory means so that the value measured by said measuring means becomes a known, predetermined value.

10. A plate thickness measuring apparatus according to claim 9, wherein a reference sample having a known value is held by a support means and said compensating means is operated on the basis of a measurement made with said plate thickness measuring apparatus of said reference sample.

11. A plate thickness measuring method comprising the steps of:

protecting a fine pattern of alternately arranged light and dark stripes on front and rear surfaces of an object through first and second object lenses respectively disposed to be opposite one another on the front and rear surface sides of the object;

forming each of reflected images of said fine patterns formed on front and rear surfaces of the object through said first and second object lenses onto first and second photodetectors respectively located adjacent to said front and rear surfaces;

detecting contrast signals each comprising a difference between light stripe signals and dark stripe signals of image signals of the reflected image patterns picked up by each of said first and second photodetectors, wherein said photodetectors have scanning functions and include calculating means for obtaining the contrast signals;

performing automatic focusing control by moving each of said first and second object lenses slightly so as to achieve each of the maximum values of said contrast signals; and estimating the thickness of the object to be measured from the difference between the relative positions of said first and second object lenses at which the maximum values of said contrast signals are obtained, wherein said fine pattern is a two-period light and dark stripes pattern having two different space-frequency components, of which a small space-frequency coarse pattern is used to perform the coarse adjustment for said automatic focusing control and the large-frequency coarse pattern of which is used to perform the fine adjustment for said automatic focusing control.

12. A plate thickness measuring apparatus comprising:

a light source;

a fine pattern of alternately arranged opaque and transparent stripes onto which light is radiated from said light source;

a pair of object lenses respectively provided oppositely to one another adjacent to front and rear sides of the object to be measured for projecting said fine pattern onto the front and rear surfaces of the object to be measured;

a pair of moving means for moving said pair of object lenses in the optical-axis direction perpendicular to the front and rear surfaces of the object to be measured, each of said moving means respectively providing a drive means for automatically moving an associated one of said object lenses;

a pair of imaging devices respectively disposed at predetermined positions adjacent to said front and rear surfaces to pick up images by scanning reflected images of said fine patterns formed on the front and rear surfaces of the object to be measured which are reflected through said pair of object lenses, each of the reflected images being formed of alternately arranged light and dark stripes;

calculating means for integrating a plurality of contrast signals each comprising a difference between a light stripe signal and dark strip signal of an image signal of a reflected image pattern picked up by said imaging devices to thereby obtain integral contrast signals for said front and rear surfaces of said object to be measured;

control means for actuating each of said drive means provided in each of said moving means to control the positions of the object lenses so as to achieve a maximum value of said integral contrast signals for said front and rear surfaces of said object to be measured obtained from said calculating means;

a pair of position detecting means for detecting the positions of said object lenses such that the relative positions of said object lenses are at the same value when the thickness of the object to be measured is zero; and measuring means for estimating the difference between the relative positions of the object lenses which are obtained from each of said position detecting means when each of said moving means are controlled by said control means to achieve the focused condition on the front and rear surfaces of the object, so as to determine the thickness of the object to be measured, wherein said fine pattern is a two-period light and dark stripes pattern having two different space-frequency components, of which a small space-frequency coarse pattern is used to perform the coarse adjustment for said automatic focusing control and the large space-frequency coarse pattern of which is used to perform the fine adjustment for said automatic focusing control.

13. A plate thickness measuring apparatus according to claim 12, wherein said pair of position detecting means comprises a pair of lens position detectors for reading the positions of the pair of object lenses, a pair of memory means for storing position signals from said pair of position detectors, and a compensating means for relatively compensating the position coordinates stored in said pair of memory means so that the value measured by said measuring means becomes a known, predetermined value.

14. A plate thickness measuring apparatus according to claim 13, wherein a reference sample having a known value is held by a support means and said compensating means is operated on the basis of a measurement made with said plate thickness measuring apparatus of said reference sample.

* * * * *